UNITED STATES PATENT OFFICE.

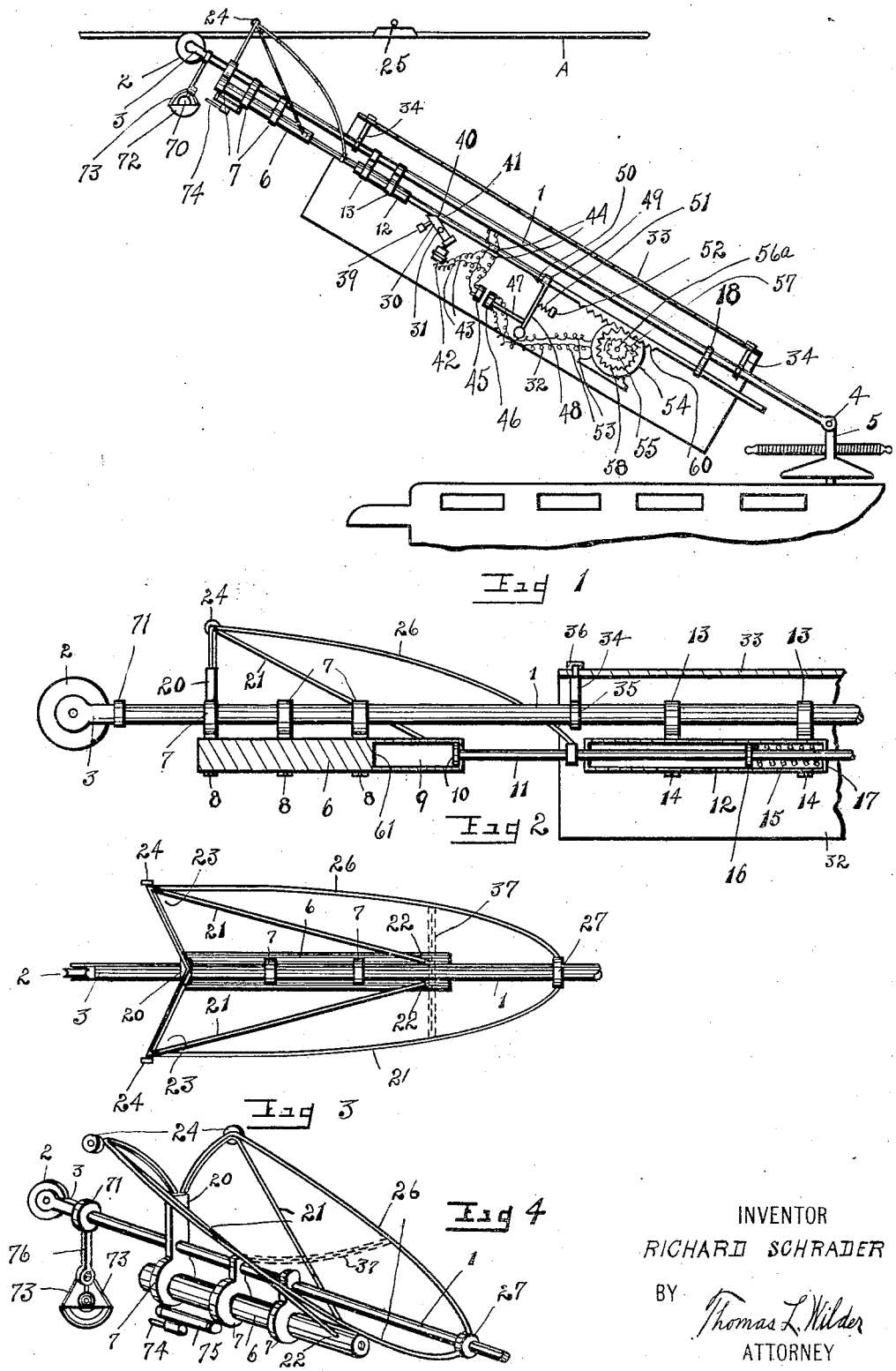

RICHARD SCHRADER, OF UTICA, NEW YORK.

TROLLEY.

1,206,145. Specification of Letters Patent. Patented Nov. 28, 1916.

Application filed February 19, 1916. Serial No. 79,235.

*To all whom it may concern:*

Be it known that I, RICHARD SCHRADER, a citizen of the United States, residing at Utica, in the county of Oneida and State of New York, have invented certain new and useful Improvements in Trolleys, of which the following is a specification, reference being had therein to the accompanying drawing.

My invention relates to a trolley and I declare the following to be a full, clear, concise and exact description thereof, sufficient to enable anyone skilled in the art to which it appertains to make and use the same, reference being had to the accompanying drawings, in which like reference characters refer to like parts throughout the specification.

The object of the invention is to provide a trolley with a simple efficient device for automatically restoring the trolley wheel thereof to the trolley line, when the said wheel slips from said trolley line. This object will be understood by referring to the drawings in which:

Figure 1 is a side elevation of the trolley, showing the same in its relative position with reference to the car and the trolley line; Fig. 2 is an enlarged fragmentary view of the trolley, showing certain parts attached thereto in section; Fig. 3 is a plan view of the upper portion of the trolley, showing certain parts assembled thereto; Fig. 4 is a perspective view of the upper portion of the trolley.

Referring more particularly to the drawings, the trolley is represented by —1— and has the usual trolley wheel 2, whose trunnions are held in journals formed in the bifurcated end 3 of the trolley —1—. The opposite end of the trolley —1— is pivotally connected in the well known manner at 4 to the members 5 attached to the roof of the car, so as to hold the trolley —1— and its wheel 2 normally against the trolley line A. A cylinder 6 is movably mounted relative to and adjacent the upper end of the trolley 1 by means of the double apertured sleeves 7—7—7. One set of the apertures loosely engage the trolley —1—, in a manner that is adapted to slide therealong, and the other set receive the cylinder 6 and are fixed thereto by set screws 8. The cylinder 6 is provided with a chamber 9 adapted for the sliding reception of the head 10 of the rod 11, which extends through the hollow cylinder 12 held stationary with relation to the trolley —1— by the double apertured sleeves 13—13 fixed to the trolley —1— and to the hollow cylinder 12 by the set screws 14.

A portion of the rod 11 within the hollow cylinder 12 is surrounded by the coiled spring 15 which bears against the collar or boss 16, secured to the rod 11, at one end, and against the surface 17 of the hollow cylinder 12, at the other. The lower end of the rod 11 has a sliding bearing in the double apertured sleeve 18, that is held in a stationary position upon the trolley —1— by a set screw.

The uppermost sleeve 7 is provided with a socket 20 in which are secured the ends of the rather stiff wires 21—21 that recede outward and upward on a curve and then downward to the cylinder 6, where they are fastened at 22—22, forming an acute angle at 23—23, at which location there is attached the rollers 24—24, whereby to aid in lessening the friction, when the wires 21 pass under the span wire 25, under given conditions. The socket 20 also holds the ends of the wires 26—26, that for a portion of their length are secured by brazing or otherwise to the wires 21 along that part extending between the socket 20 and the rollers 24, whereby to add strength to said portion. The remaining rather flexible parts of the wires 26 are extended in a curving manner to the collar 27 that is held to the rod 11 by a set screw. A chain 37 is attached to the wires 26 adjacent their middle sections, whereby to limit the outward or lateral expansion or bending of said wires.

The rod 11 is held in predetermined position against the tension of the coiled spring 15 by a pawl 30, pivotally mounted to a spindle 31 having bearings at either end in the side members 32—32 of the hood 33, that is held in assembled position by the brackets 34—34 that are sleeved to the trolley —1— at 35 and held thereto by set screws. The upper ends of the brackets 34 are shouldered and threaded for the reception of the nuts 36, whereby to hold the hood in position.

The pawl 30 has a tooth 40, that is adapted to engage the recess 41 formed in the rod 11, whereby to hold said rod 11 normally in given location against the tension of the coiled spring 15. The tooth 40 is held within the recess 41 by the temporary magnet 42, which is energized by electricity from the main circuit through its connection with the trolley —1—, by means of the wires 43—43, that join wires 44—44 attached at one end to the trolley —1— and at the other to the block 45 made of a conductory metal and held by insulation to the side members 32 of hood 33. A weight 39 secured to the pawl 30 is intended to withdraw the tooth 40 from the recess 41, when the member 40 is demagnetized. A second conductory block 46 is adapted to contact, at given intervals, with the block 45. The block 46 is held by insulation to the arm 47 integral with the arm 48, sleeved at 49 to the rod 11. The sleeve 49 engages the rod 11 in a loose manner, whereby the rod 11 can slide therethrough at predetermined times. A tooth 50 formed upon the under side of the rod 11 normally holds the arm 48 against the tension of the coiled spring 51, that is fastened at one end to the arm 48 and at the other to the insulated bar 52, attached to the sides 32 of the hood 33. In this latter position, the block 46 will not make contact with the block 45. Furthermore, the block 46 is connected by the wires 53—53 with the electric motor 54.

A ratchet wheel 55 is fastened to one end of the shaft 56ª of the motor 54. The teeth of the ratchet 55 are engaged by the pawl or detent 57 pivoted to the spur gear 58, whereby the gear 58 will revolve with the shaft in one direction and remain stationary or independent of the rotation of the shaft 56ª in the other. The spur gear 58 is in mesh with the rack 60 of the rod 11, whereby the turning of the gear 58 in the direction indicated by the arrow will draw the rod 11 down against the tension of the spring 15.

An electric bulb 70 is attached to the under side of the collar 71 and has a reflector 72 held in position by the members 73. The bulb 70 is lighted when the metallic switch 74 of the storage battery 75, attached to the sleeves 7, is brought into contact with the recess in the member 76 forming a closed circuit with the bulb 70. Therefore, the bulb 70 will be lighted when the trolley —1— is off from the wire A, and remain so until the trolley is returned to the wire again.

The operation of the device is effected immediately the trolley wheel 2 slips off from the trolley line or wire A. In this event the electric circuit from the trolley pole —1— to the temporary magnet 43 is broken and the magnet demagnetized, whereupon the tooth 40 of the pawl 30 drops down, under the influence of the weight 39, free from the recess 41 of the rod 11, which will then move upward by reason of the tension of the spring 15 against the collar 16 on said rod 11. As the rod 11 moves upward, the collar 27 will move therewith and cause the wires 26—26 to bend upward, whereby to form an easy approach for and thereby ward off the interference of the span wire 25 with the upper ends of said wires 26 adjacent the location of the rollers 24. In the first instance, the rod 11 moves upward independent of the cylinder 6. Immediately, however, the head 10 of the rod 11 comes in contact with the end surface 61 of the chamber 9, the entire cylinder 6 will move in unison therewith until stopped by the ring 71 fixed to the trolley —1—, adjacent the trolley wheel 2. When the said cylinder 6 has reached this latter position, the wires 21 will be in position to cause the trolley wire A to ride theredown and drop into the groove of the trolley wheel 2. The junction of the ends of the wires 21 with the socket 20 being in this elevated position of the cylinder 6, on a level with the uppermost edge of the flange of the trolley wheel 2. As the rod 11 goes upward, the tooth 50 will recede from the collar 49 of the arm 48 which will be urged forward by the coiled spring 51, whereby the block 46 will make contact with the block 45 and, hence, be in such position to complete the electric circuit to the motor 54, when the trolley wheel 2 is restored to the trolley line A. When this happens, the motor 54 will be electrified and cause the shaft 56ª to revolve and therewith the ratchet 55 and the gear 58, so that the rod 11 by reason of its rack meshing with the gear 58 will be pulled down against the tension of the spring 15 until the tooth 50 comes or abuts against the collar 49 of the arm 48 and thereby breaks the electric circuit by separating the blocks 45 and 46. Moreover, at this instant, the tooth 40 of the pawl 30 will engage the recess 41 of the rod 11, because of the restoration of the magnet, and lock the said rod 11 against any upward tendency under the influence of the spring 15, so that the parts will be in position to again restore the trolley wheel 2, when it again slips off the wire A. During the time the trolley wheel 2 is off from the wire A, the bulb 70 will be lighted by reason of the contact of the switch 74 with the member 76, as heretofore explained.

Having thus described my invention, what I claim as new and desire to secure by Letters Patent is:

1. In a trolley, wires mounted thereon for restoring the trolley to a given position, a rack and gear for restoring said wires to normal position, and an electric motor for revolving said gear.

2. In a trolley, a trolley wheel, adapted to run under a trolley wire, wires movably mounted upon said trolley, automatic means for moving said wires into given position, whereby to restore the trolley wheel to the trolley wire and a rack and gear for restoring said wires to normal position.

3. In a trolley, a trolley wheel adapted to run under a trolley wire, a cylindrical casing movably mounted in relation to said trolley, wires extending from the upper end of said trolley, automatic means for moving said casing and wires at given intervals, whereby to restore the trolley wheel to the trolley wire and a rack and gear for restoring said casing to normal position.

4. In a trolley, a trolley wheel adapted to run against a trolley wire, a casing movably mounted in relation to said trolley, wires extending from said casing, spring means for actuating said casing, whereby to move the wires to restore the trolley wheel to the trolley wire and a rack and gear for restoring said casing to normal position.

5. In a trolley, flexible wires connected to a collar attached to a rod, a rack on said rod, a gear in mesh with said rack, a spring for moving said rod, whereby to restore the trolley wheel to the trolley line, and means for revolving said gear, whereby to restore said rod to normal position.

6. In a trolley, a cylinder movably mounted thereon, wires attached to said cylinder, a rod for actuating said cylinder, and a spring for moving said cylinder and bending said wires, whereby to restore the trolley wheel to the trolley line.

In testimony whereof I have affixed my signature.

RICHARD SCHRADER.

Copies of this patent may be obtained for five cents each, by addressing the "Commissioner of Patents, Washington, D C."